US012470991B2

(12) United States Patent
Walldeen et al.

(10) Patent No.: US 12,470,991 B2
(45) Date of Patent: Nov. 11, 2025

(54) SIGNALLING REDUNDANCY IN A WIRELESS COMMUNICATION SYSTEM

(71) Applicant: Telefonaktiebolaget LM Ericsson (publ), Stockholm (SE)

(72) Inventors: Thomas Walldeen, Linköping (SE); Fredrik Jonsson, Mantorp (SE); Fredrik Sonnevi, Hägersten (SE); Stefan Johansson, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 445 days.

(21) Appl. No.: 18/010,764

(22) PCT Filed: Jun. 15, 2020

(86) PCT No.: PCT/SE2020/050620
§ 371 (c)(1),
(2) Date: Dec. 15, 2022

(87) PCT Pub. No.: WO2021/256970
PCT Pub. Date: Dec. 23, 2021

(65) Prior Publication Data
US 2023/0269641 A1    Aug. 24, 2023

(51) Int. Cl.
*H04W 36/08* (2009.01)
*H04W 36/00* (2009.01)

(52) U.S. Cl.
CPC ....... *H04W 36/08* (2013.01); *H04W 36/0061* (2013.01)

(58) Field of Classification Search
CPC . H04W 36/08; H04W 36/0061; H04W 24/04; H04W 88/08; H04W 88/18; H04L 1/22

(Continued)

(56) References Cited

U.S. PATENT DOCUMENTS

| 2012/0315906 A1* | 12/2012 | Stephens | H04W 24/04 455/436 |
| 2020/0107204 A1* | 4/2020 | Barabell | H04W 16/32 |
| 2022/0191756 A1* | 6/2022 | Vamanan | H04W 36/08 |

FOREIGN PATENT DOCUMENTS

| CN | 102131221 B | 12/2013 |
| EP | 1898656 A1 | 3/2008 |

(Continued)

OTHER PUBLICATIONS

International Search Report and Written Opinion of the International Searching Authority, PCT/SE2020/050620, mailed Apr. 23, 2021, 13 pages.

(Continued)

*Primary Examiner* — Kwang B Yao
*Assistant Examiner* — Syed M Bokhari
(74) *Attorney, Agent, or Firm* — Sage Patent Group

(57) ABSTRACT

A wireless communication system comprises a wireless node for communication with wireless devices camping on a first cell, the node including a local control unit controlling communication between the system and the wireless devices, the system further comprising a first signalling control unit and a second signalling control unit), both provided for handling signalling of a first group of cells at least including the first cell and each providing a different cell identity for this cell, wherein the first signalling control unit acts as a primary signalling control unit for the first group of cells and the second signalling control unit acts as a secondary signalling control unit for the first group of cells.

17 Claims, 9 Drawing Sheets

(58) Field of Classification Search
USPC .......................................................... 370/331
See application file for complete search history.

(56) References Cited

FOREIGN PATENT DOCUMENTS

| EP | 2661118 A1 | 11/2013 |
|---|---|---|
| EP | 3588851 A1 | 1/2020 |
| EP | 3648528 A1 | 5/2020 |
| WO | WO 2009/049552 A1 | 4/2009 |

OTHER PUBLICATIONS

Liu, C., et al., "Controller Deployment in SDN-Enabled Redundant Structure with Considering Network Reliability," 2019 IEEE International Conference on Energy Internet (ICEI) 5 pages.
3GPP TSG-RAN WG3 AH #2, Tdoc R3-172511, Qingdao, P.R. China, Jun. 27-29, 2017, Agenda Item 10.10.1, Ericsson, "Resilience and Scalability in a Disaggregated gNB," 3 pages.
Search Report, European Patent Application No. 20940882.2, mailed Feb. 16, 2024, 13 pages.
3GPP TSG-RAN WG3 #96, Hangzhou, P.R. China, May 15-19, 2017, R3-171693, Agenda Item 10.10.2, Vodafone, "Many to Many Connections of CUs and DUs," 9 pages.

* cited by examiner

SIGNALLING REDUNDANCY IN A WIRELESS COMMUNICATION SYSTEM

CROSS REFERENCE TO RELATED APPLICATIONS

This application is a 35 U.S.C. § 371 national stage application of PCT International Application No. PCT/SE2020/050620 filed on Jun. 15, 2020, the disclosure and content of which is incorporated by reference herein in its entirety.

TECHNICAL FIELD

The invention relates to signalling redundancy in a wireless communication system. More particularly, the invention relates to a wireless node and a method, computer program and computer program product for handling redundancy in a wireless communication system as well as to a signalling control device and a method, computer program and computer program product for providing signalling redundancy in a wireless communication system.

BACKGROUND

The current Third Generation Partnership Project (3GPP) specification specifies an architecture where a gNodeB within an NG RAN (Next Generation Radio Access Network) is built up of a Central Unit (gNB-CU) and one or more Distributed Units (gNB-DUs). The CU can in its turn be divided into a CU Control Plane (gNB-CU-CP) part and one or more CU User Plane parts (gNB-CU-UPs). Note that one gNB has one and only one gNB-CU-CP part.

The gNB-CU-CP part may have specific configured data for each supported NR (New Radio) cell in the gNodeB and it also has a common gNodeB identity. This identity is also known in the DU, neighbour gNodeBs and also broadcasted as part of the cell identity to the User Equipment (UEs) in the NR cells in the gNodeB.

If a gNB-CU-CP fails (i.e— a network element realizing the gNB-CU-CP fails), the network support for the NR cells are lost and the UE cannot communicate. If the network element cannot restore the service, for example due to hardware (HW) failure of all available HW (e.g. a whole virtual infrastructure manager (VIM) crashes in a cloud deployment), the only way to restore the service is to move the realization of the gNB-CU-CP to another HW. In this case for example move the realization of the gNB-CU-CP to HW served by another VIM (on possibly another physical location, i.e. geo-redundancy).

However, there are problems related to the above described operation. For example, one problem is that the gNB-CU-CP may not have totally failed and some DUs are still being served. Then the moving of the CU-CP must be coordinated since the gNodeB has to be unique in the NG-RAN and then leading to impact on UE served by still working DUs. All these 'moving of gNB-CU-CP solutions' have the disadvantage that they must ensure that the previous realization of the gNB-CU-CP really is dead before starting of the new realization. This leads to both rather slow as well as complex solutions. It is also not possible to later restore the gNB-CU-CP realization (on the old location) without traffic impact.

There is thus a need for improving on the situation.

SUMMARY

One object of the invention is therefore to provide signalling redundancy in a wireless communication system.

This object is according to a first aspect achieved through a wireless node in a wireless communication system, where the wireless node comprises a local control unit and radio communication circuity for wireless communication with wireless communication devices that camp on a first cell. The local control unit is set to communicate with a first and a second signalling control unit, both being provided for handling signalling of a first group of cells at least comprising the first cell. Each signalling control unit provides a different cell identity for this first cell. Moreover, the first signalling control unit acts as a primary signalling control unit for the first group of cells and the second signalling control unit acs as a secondary signalling control unit for the first group of cells. Finally, the wireless node comprises a processor acting on computer instructions implementing the local control unit whereby the local control unit is configured to: communicate with the second signalling control unit for implementing redundancy measures for the first cell, where the redundancy measures make the secondary signalling control unit into a backup signalling control unit for the primary signalling control unit.

The object is according to a second aspect achieved through a method of handling redundancy in a wireless communication system, where the wireless communication system comprises a wireless node for wireless communication with wireless communication devices that camp on a first cell and the wireless node comprises a local control unit controlling communication between the wireless communication system and the wireless communication devices. The local control unit is set to communicate with a first and a second signalling control unit, both being provided for handling signalling of a first group of cells at least comprising the first cell and each providing a different cell identity for this first cell. Moreover, the first signalling control unit acts as a primary signalling control unit for the first group of cells and the second signalling control unit acts as a secondary signalling control unit for the first group of cells. The method is performed by the local control unit and comprises: communicating with the second signalling control unit for implementing redundancy measures for the first cell, where the redundancy measures make the secondary signalling control unit into a backup signalling control unit for the primary signalling control unit.

The object is according to a third aspect of the invention achieved through a computer program for handling redundancy in a wireless communication system, where the wireless communication system comprises a wireless node for wireless communication with wireless communication devices that camp on a first cell. The wireless node comprises a local control unit controlling communication between the wireless communication system and the wireless communication devices. The local control unit is set to communicate with a first and a second signalling control unit, both being provided for handling signalling of a first group of cells at least comprising the first cell and each providing a different cell identity for this first cell. Moreover, the first signalling control unit acts as a primary signalling control unit for the first group of cells and the second signalling control unit acts as a secondary signalling control unit for the first group of cells. The computer program comprises computer program code which when run by a processor of the wireless node, implements the local control unit configured to: communicate with the second signalling control unit for implementing redundancy measures for the first cell, where the redundancy measures make the secondary signalling control unit into a backup signalling control unit for the primary signalling control.

The object is according to a fourth aspect achieved through a computer program product for handling redundancy in a wireless communication system, the computer program product comprising a data carrier with the computer program code according to the third aspect.

According to a first variation of the first aspect, the local control unit is configured to broadcast the cell identity of the primary signalling control unit in the first cell.

According to a corresponding variation of the second aspect, the method further comprises broadcasting the cell identity of the primary signalling control unit in the first cell.

According to a second variation of the first and second aspects, the communication with the secondary signalling control unit comprises selecting one of the primary and secondary signalling control units to be the recipient of a request for a connection received from a wireless communication device that camps on the first cell, forwarding the connection request to the selected signalling control unit and using the cell identity of the selected signalling control unit for the connection.

According to a third variation of the first and second aspects, the communication with the secondary signalling control unit comprises informing the secondary signalling control unit that it has handover limitations in relation to the first cell. The handover limitations may comprise only allowing handover of wireless communication devices from the first cell to another cell. The handover limitations may also involve a barring of all handovers between the first cell and other cells.

According to a fourth variation of the first aspect, the local control unit is further operative to ensure that paging in the first cell is made for one of the primary and secondary signalling control units.

According to a corresponding variation of the second aspect, the method comprises ensuring that paging in the first cell is made for one of the primary and secondary signalling control units.

The ensuring that paging in the first cell is made for one of the primary and secondary signalling control unit may be static in that paging is only made for one of signalling control units. It may also be dynamic in that a selection may be dynamically made of which signalling control unit for which paging is to be made. The ensuring that paging in the first cell is only made for one of the primary and secondary signalling control unit may comprise instructing one of the signalling control units to filter away paging for the first cell. The ensuring that paging in the first cell is only made for the one of the primary and secondary signalling control units may also comprise removing pages for the first cell received from the one of the signalling control units and transmitting the pages from the other signalling control unit in the cell.

According to a fifth variation of the first aspect, the local control unit is configured to instruct the second signalling control unit to become a primary signalling control unit in case the first signalling control unit acting as a primary signalling control unit becomes faulty.

According to a corresponding variation of the second aspect, the method further comprises instructing the second signalling control unit to become a primary signalling control unit in case the first signalling control unit acting as a primary signalling control unit becomes faulty.

According to a sixth variation of the first aspect, the local control unit is configured to instruct the second signalling control unit to resume being secondary signalling control unit in case the first signalling control unit again becomes functional.

According to a corresponding variation of the second aspect, the method further comprises instructing the second signalling control unit to resume being secondary signalling control unit in case the first signalling control unit again becomes functional.

The above mentioned object is according to a fifth aspect also achieved through a signalling control device for a first group of cells at least comprising a first cell in a wireless communication system, where the wireless communication system comprises a wireless node for wireless communication with wireless communication devices that camp on the first cell. The wireless node comprises a local control unit controlling communication between the wireless communication system and the wireless communication devices. The local control unit is set to communicate with a first and a second signalling control unit, both being provided for handling signalling of the first group of cells and each providing a different cell identity for this first cell. Moreover, the first signalling control unit acts as a primary signalling control unit for the first group of cells. The signalling control device comprises a processor acting on computer instructions whereby the signalling control device is operative to implement the second signalling control unit acting as a secondary signalling control unit for the first group of cells, where the acting as a secondary signalling control unit comprises implementing redundancy measures for the first cell making the secondary signalling control unit into a backup signalling control unit for the primary signalling control unit.

The object is according to a sixth aspect also achieved by a method of providing signalling redundancy in a wireless communication system, where the wireless communication system comprises a wireless node for wireless communication with wireless communication devices that camp on a first cell. The wireless node comprises a local control unit controlling communication between the wireless communication system and the wireless communication devices. The local control unit is set to communicate with a first and a second signalling control unit, both being provided for handling signalling of a first group of cells at least comprising the first cell and each providing a different cell identity for this first cell. Moreover, the first signalling control unit acts as a primary signalling control unit for the first group of cells. The method is performed by the second signalling control unit acting as a secondary signalling control unit for the first group of cells when the first signalling control unit acts as primary signalling control unit for the first group of cells, where the acting as a secondary signalling control unit comprises: implementing redundancy measures for the first cell, which redundancy measures makes the secondary signalling control unit into a backup signalling control unit for the primary signalling control unit.

The object is according to a seventh aspect of the invention also achieved through a computer program for providing signalling redundancy in a wireless communication system, where the wireless communication system comprises a wireless node for wireless communication with wireless communication devices that camp on a first cell. The wireless node comprises a local control unit controlling communication between the wireless communication system and the wireless communication devices. The local control unit is set to communicate with a first and a second signalling control unit, both being provided for handling signalling of a first group of cells at least comprising the first cell and each providing a different cell identity for this first cell. Moreover, the first signalling control unit acts as a primary signalling control unit for the first group of cells.

The computer program comprises computer program code which when run by a processor of a signalling control device implements the second signalling control unit acting as a secondary signalling control unit for the first group of cells. The acting as a secondary signalling control unit comprises implementing redundancy measures for the first cell, which redundancy measures make the secondary signalling control unit into a backup signalling control unit for the primary signalling control unit.

The object is according to an eighth aspect also achieved through a computer program product for providing signalling redundancy in a wireless communication system. The computer program product comprises a data carrier with computer program code according to the seventh aspect.

The object is according to a ninth aspect achieved through a wireless communication system comprising a wireless node for wireless communication with wireless communication devices that camp on a first cell. The wireless node comprises a local control unit controlling communication between the wireless communication system and the wireless communication devices, The system further comprises a first signalling control unit and a second signalling control unit, both being provided for handling signalling of the first cell and each providing a different cell identity for the first cell. Moreover, the first signalling control unit is configured to act as a primary signalling control unit for the first group of cells and the second signalling control unit is configured to act as a secondary signalling control unit for the first group of cells. The acting as a secondary signalling control unit comprises implementing redundancy measures for the first cell, which redundancy measures make the secondary signalling control unit into a backup signalling control unit for the primary signalling control unit.

The broadcasting in the first cell may be made using the cell identity of the primary signalling control unit.

According to a first variation of the fifth and sixth aspects, the implementing of redundancy measures in the second signalling control unit may comprise using the second cell identity for connections set up based on connection requests from wireless communication devices in the first cell.

According to a second variation of the fifth and sixth aspects, the implementing of redundancy measures may comprise applying handover limitations for the wireless communication devices in the first cell. The handover limitations may comprise only allowing handover of wireless communication devices from the first cell to another cell. The handover limitations may alternatively involve a barring of all handovers between the first cell and other cells. The handover limitations may be preconfigured in the second signalling control unit. As an alternative information about them may be received from the local control unit. In this case the second signalling control unit may be configured to receive information about the handover limitations from the local control unit and the method may comprise receiving information about the handover limitations from the local control unit.

The redundancy measures may additionally comprise paging handling routines. The paging handling routines may be preconfigured in the second signalling control unit. As an alternative information about them may be received from the local control unit.

According to a third variation of the fifth aspect, the local control unit may be configured to receive an instruction from the local control unit regarding how to handle pages and pass the pages to or block the pages from reaching the local control unit based on the instruction.

According to a corresponding variation of the sixth aspect, the method may comprise receiving an instruction from the local control unit regarding how to handle pages and passing the pages to or blocking the pages from reaching the local control unit based on the instruction.

According to a fourth variation of the fifth and the sixth aspects, the implementing of redundancy measures comprises disabling paging of wireless communication devices in the first cell.

According to a fifth variation of the fifth aspect, the second signalling control unit is further operative to take over the role as a primary signalling control unit for the first cell in case the first signalling control unit is faulty.

According to a corresponding variation of the sixth aspect, the method further comprises taking over the role as a primary signalling control unit for the first cell in case the first signalling control unit is faulty.

The first signalling control unit may again become functional and resume acting as a primary signalling control unit, According to a sixth variation of the fifth aspect, the second signalling control unit may then be further operative to resume acting as a secondary signalling control unit and to hand over one or more connections to the restored primary signalling control unit.

According to a corresponding variation of the sixth aspect, the method may then further comprise resuming acting as a secondary signalling control unit and handing over one or more connections to the restored primary signalling control unit.

There may furthermore be a second group of cells that is disjoint from the first group of cells and a further signalling control unit acting as a primary signalling control unit for the second group of cells According to a seventh variation of the fifth and sixth aspect, the acting as a secondary signalling control unit may comprise the acting as a secondary control unit also for a second group of cells. The acting as a secondary signalling control unit may then comprise implementing redundancy measures for a cell in the second group of cells.

In a further variation of all the previously mentioned aspects, the redundancy measures may comprise allowing the secondary signalling control unit limited interaction with wireless communication devices as well as with the core network, where the limitation may be limitations with regard to the initiation of user data transmissions to and from wireless communication devices in the first cell as well as with the moving of such user data transmissions.

The invention has a number of advantages. One advantage is that a local control unit can connect to two or more signalling control units at the same time. In the simplest solution one signalling control unit is primary and it is used if it is working. This enables that wireless communication device covered by cells in the local control unit can set up new connections even if one of the signalling control units has failed and hence the system availability may increase. The core network can further be unaware about the redundancy solution and hence no updates in interfaces between the core network and the radio access network and no core network internal changes are needed.

It should be emphasized that the term "comprises/comprising" when used in this specification is taken to specify the presence of stated features, integers, steps or components, but does not preclude the presence or addition of one or more other features, integers, steps, components or groups thereof.

BRIEF DESCRIPTION OF THE DRAWINGS

The invention will now be described in more detail in relation to the enclosed drawings, in which.

DETAILED DESCRIPTION

In the following description, for purposes of explanation and not limitation, specific details are set forth such as particular architectures, interfaces, techniques, etc. in order to provide a thorough understanding of the invention. However, it will be apparent to those skilled in the art that the invention may be practiced in other embodiments that depart from these specific details. In other instances, detailed descriptions of well-known devices, circuits, and methods are omitted so as not to obscure the description of the invention with unnecessary detail.

Aspects of the present invention are concerned with the providing of redundancy in a wireless communication system. Redundancy is achieved through the provision of two signalling control units, such as two gNB-CU-CPs, that have different cell identities but that also share one or more local control unit, such as a gNB-DU, that provides a cell on which wireless communication devices may camp. The local control unit may then use one signalling control unit as primary and the other(s) as secondary or backup. The cell identity of the primary signalling control unit may be broadcast in the cell and hence also the base for mobility such as radio resource control (RRC) based mobility. This means that the combination of two signalling control units and one or more shared local control unit may be seen as different access network nodes by the core network. These nodes, or different gNodeBs, may have the same network properties (e.g. Tracking Area Codes (TAC), Radio Access Network Area Codes (RANAC)).

The wireless communication system, may as an example be a fifth generation (5G) mobile communications system for instance as specified by the third Generation Partnership Project (3GPP). The invention will be described below in relation to 5G. However, it should be realized that the principles described herein may be used in other generations as well as in other types of wireless communication systems.

Figure 1:
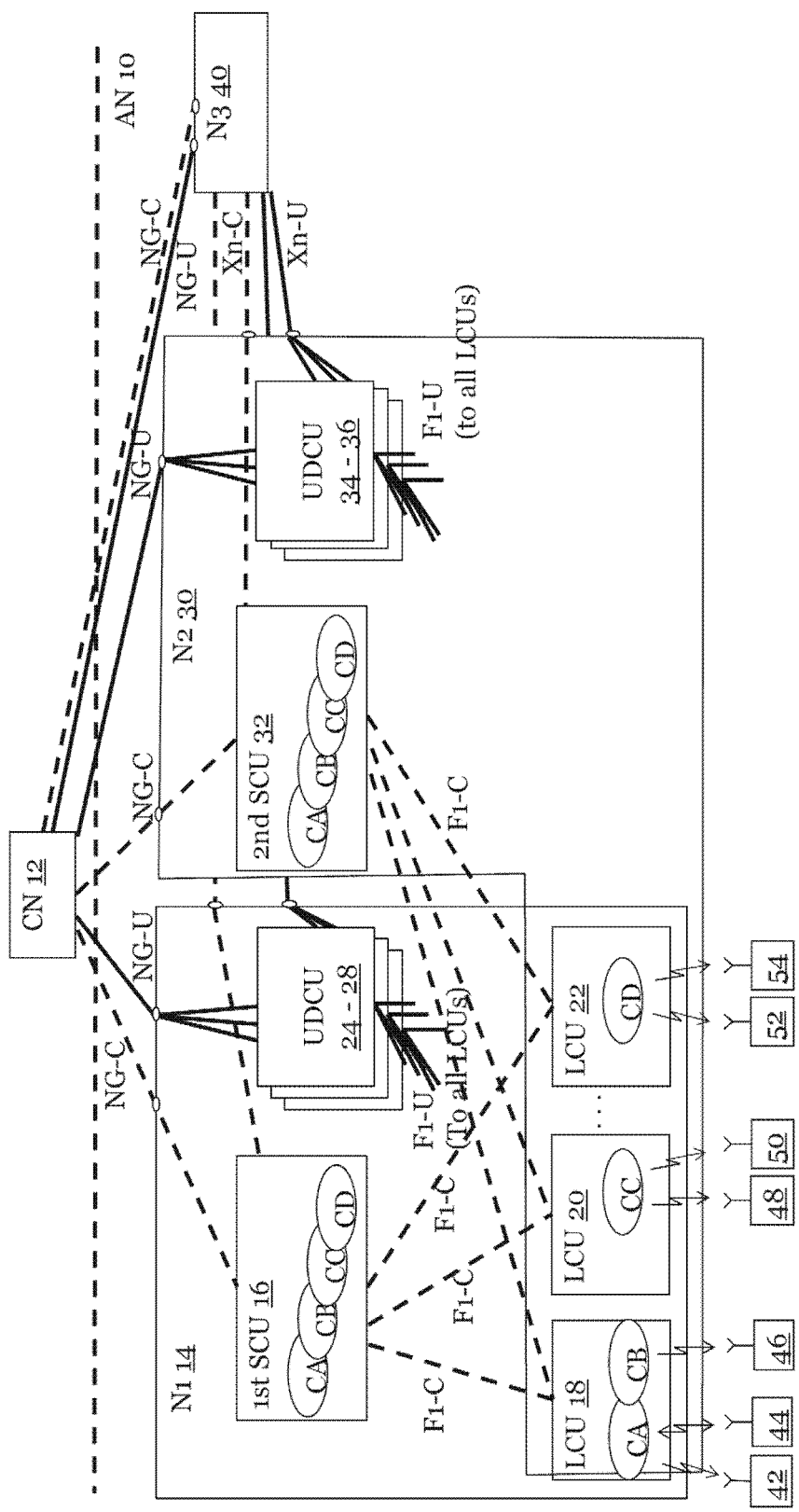
FIG. 1 schematically shows a wireless communication system comprising an access network with a number of access network nodes connected to a core network, where a first access network node comprises a first signalling control unit and a group of user data control units as well as a number of local control units, each serving a separate group of wireless communication devices, FIG. 2 schematically shows a cell comprising a local control unit and a transceiver, where the local control unit communicates with a first signalling control unit and a second signalling control unit.

FIG. 1 schematically shows a wireless communication system, which may be a system of the above described type. The system may furthermore comprise an access network AN 10 and a core network CN 12. The access network 10 comprises a number of access network nodes, where in the figure there is a first node N1 14, a second node N2 30 and a third node N3 40, where each node is a gNodeB or rather a gNodeB as seen by the core network 12. Each node comprises a signalling control unit, which in this case is a gNB-CU-CP i.e. a control plane control unit of the node and a number of user data control units in the form of one or more gNB-CU-UP, i.e. one or more User Plane Control Units. As an example the first node 14 is shown as comprising a first signalling control unit SCU 16 and three user data control units UDCU 24-28, while the second node 30 is shown as comprising a second signalling control unit SCU 32 and three user data control units UDCU 34-36. Also the third node 40 comprises these units. However, they have been omitted from the figure.

There is also a group of local control units, where in this case there is a group of one or more gNB-DUs, i.e. one or more gNB distributed units. There is here a first local control unit LCU 18, a second local control unit LCU 20 and a third local control unit LCU 22. Each local control unit also controls wireless communication in at least one cell, where as an example the first local control unit 18 controls wireless communication in a first and a second cell CA and CB, while the second local control unit 20 controls wireless communication in a third cell CC and the third local control unit 22 controls wireless communication in a fourth cell CD. A number of wireless communication devices, typically named User Equipment (UE), may be camping on the cells and as an example a first and a second wireless communication device 42 and 44 are camped on the first cell CA, a third wireless communication device 46 is camped on the second cell CB, a fourth and fifth wireless communication device 48 and 50 are camped on the third cell CC and a sixth and seventh wireless communication device 52 and 54 are camped on the fourth cell CD.

Although it is not shown, the third node 40 also comprises one or more local control units, each covering one or more cells.

Each signalling control unit SCU in a node communicates with a local control unit LCU in the access network node via a corresponding signalling or control plane interface, in 5G termed F1-C, while every user data control unit communicates with every local control unit in the access network node via dedicated user data interface F1-U. The signalling control unit SCU of a node may additionally communicate with the user data control units UDCU of the node via so-called E1 interfaces (not shown). Furthermore, the signalling control unit SCU of one node may communicate with other signalling control units of other nodes via a corresponding signalling or control plane interface Xn-C, while the user data control units UDCU of a node may communicate with the user data control units of other nodes via a user data interface Xn-U. The signalling control units SCU may additionally communicate with the core network 12 via a signalling or control plane interface NG-C, while the user data control units UDCU may communicate with the core network 12 via a user data interface NG-U.

A signalling control unit controls the signalling performed in the different cells of the node. This involves providing the cell with a cell identifier which is used for broadcasting in the cell as well as for communication with the core network 12.

According to aspects of the invention the first and second node 14 and 30 are both provided for all of the cells provided by the local control units 18, 20 and 22, i.e. for the first, second third and fourth cells CA, CB, CC and CD. The signalling control units 16 and 32 and the user data control units 24-28 and 34-36 of both nodes 14 and 30 therefore communicate with these local control units 18, 20 and 22. The local control units 18, 20 and 22 are thereby shared by the signalling control units 16 and 32 and user data control units 24-28 and 34-36 of both the nodes 14 and 30. The local control units 18, 20 and 22 thereby belong to both the nodes 14 and 30. This is done in order to provide signalling redundancy.

Figure 2:
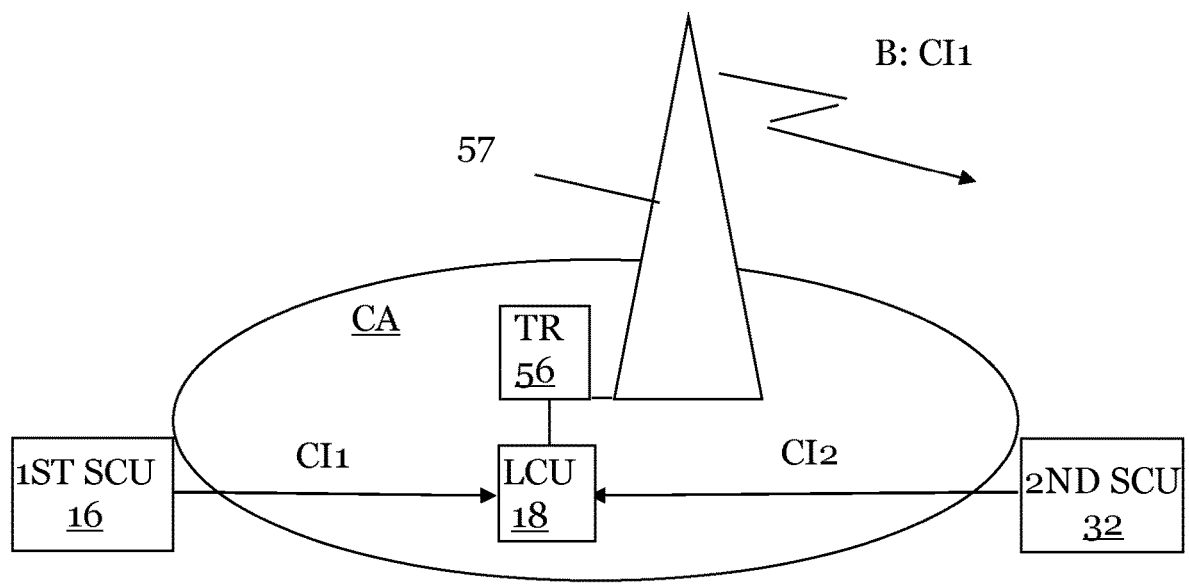

FIG. 2 schematically shows an antenna 57 in the form of a mast connected to the first local control unit 18 via a transceiver 56, where at least the first local control unit 18 and the transceiver 56 forms a first wireless node transmitting in the first cell CA. It can also be seen that the first local control unit 18 receives a first cell identifier CI1 from the first signalling control unit 16 as well as a second cell identifier CI2 from the second signalling control unit 32. Both these cell identifiers are assigned to the first cell CA. It can also be seen that the first cell identifier CI1 is broadcast B by the transceiver 56 via the antenna 57 in the first cell CA.

Figure 3:
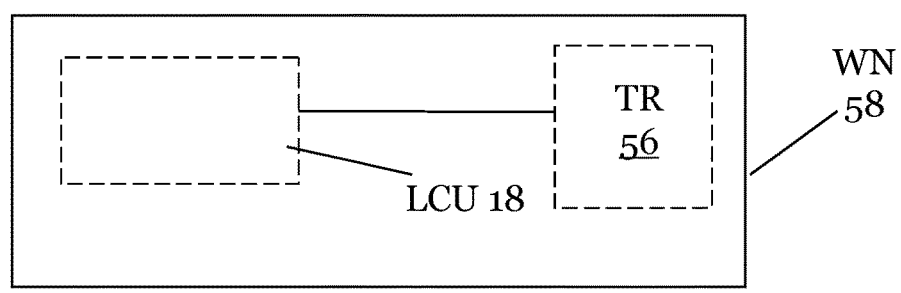
FIG. 3 shows a block schematic of a wireless node comprising the local control unit and transceiver.

FIG. 3 shows a basic realization of the wireless node WN 58 comprising the first local control unit LCU 18 and the transceiver TR 58. The wireless node 58 is a device in the wireless communication system that communicates with wireless communication devices such as User Equipment according to a suitable wireless communication standard. It should for this reason be realized that also the antenna 57 may be a part of this device. The wireless node may also comprise an antenna and possibly also a transceiver for transmitting in the second cell (not shown). Depending on how close the third and fourth cells are to the first and second cells, it is also possible that the second and/or third local control units and corresponding transceivers possibly together with antennas are a part of this wireless node. It is additionally possible that the first signalling control unit and/or one or more of the user data control units of the first cell are a part of the wireless node. It is also possible that the second signalling control unit and the user data control units of the second access network node are a part of this device forming the wireless node 58. However, one or more of these latter units may just as well be provided as one or more separate devices.

Figure 4:
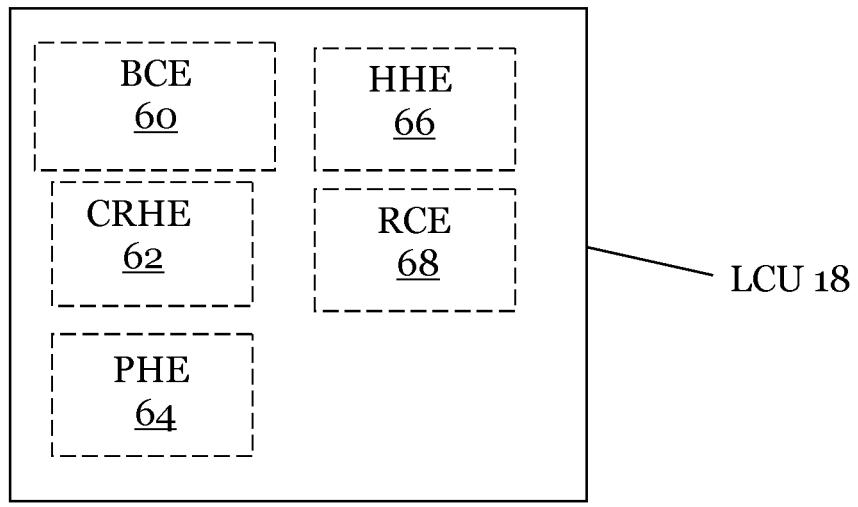
FIG. 4 shows a block schematic of a first realization of the wireless node comprising a broadcast control element, a connection request handling element, a redundancy control element and a paging handling element.

There are a number of ways in which the first local control unit 18 may be realized and FIG. 4 shows a first such realization. In this first realization, the first local control unit 18 comprises a broadcasting control element BCE 60, a connection request handling element CRHE 62, a paging handling element PHE 64, a handover handling element HHE 66 and a redundancy control element 68.

The elements of the local control unit 18 may be provided as software blocks, for instance as software blocks in a program memory, but also as processing circuitry or hardware blocks for instance as one or more dedicated special purpose circuits, such as Application Specific Integrated Circuits (ASICs) and Field-Programmable Gate Arrays (FPGAs).

Figure 5:
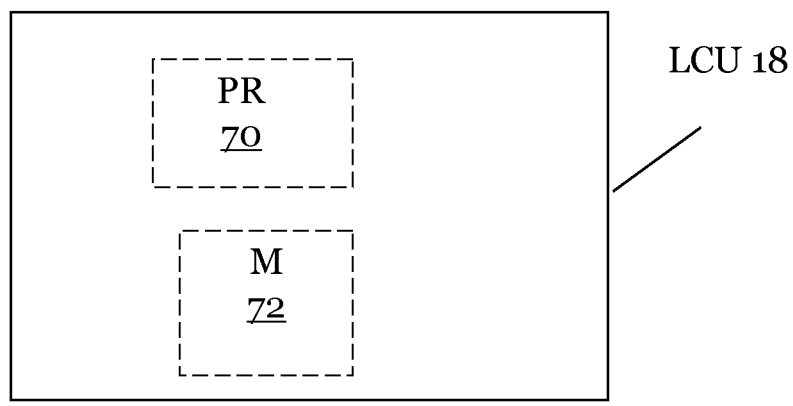
FIG. 5 shows a block schematic of a second realization of the wireless node in the form of a processor and a memory, FIG. 6 schematically shows a signalling control device comprising a second signalling control unit, FIG. 7 schematically shows a first realization of the second signalling control unit comprising a connection request handling block, a handover handling block, a paging handling block and a redundancy control block.

FIG. 5 shows a block schematic of a second realization of the local control unit 18. It may in this case be provided in the form of a processor PR 70 connected to a program memory M 72. The program memory 72 may comprise a number of computer instructions implementing the functionality of the local control unit 18 and the processor 70 implements this functionality when acting on these instructions. It can thus be seen that the combination of processor 70 and memory 72 thereby provides processing circuitry implementing the local control unit.

Figure 6:
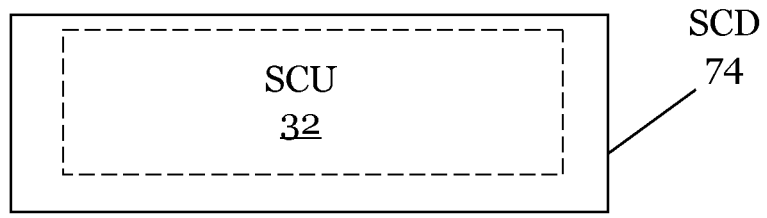

FIG. 6 shows a block schematic of a signalling control device SCD 74, which comprises the second signalling control unit SCU 32. The signalling control device 74 is a device that acts as a communication node for communicating with the core network. It is more particularly a device that implements the second signalling control unit 32 and thus provides the second cell identifier CI2 of the second access network node. It should here be realized that it is possible that the signalling control device 74 also comprises the user data control units of the second access network node. Another possibility is that it comprises the first signalling control unit and/or the user data control units of the first access network node. It is additionally possible that the signalling control device 74 comprises the second and/or third local control units with or without their associated transceivers and antennas.

Figure 7:
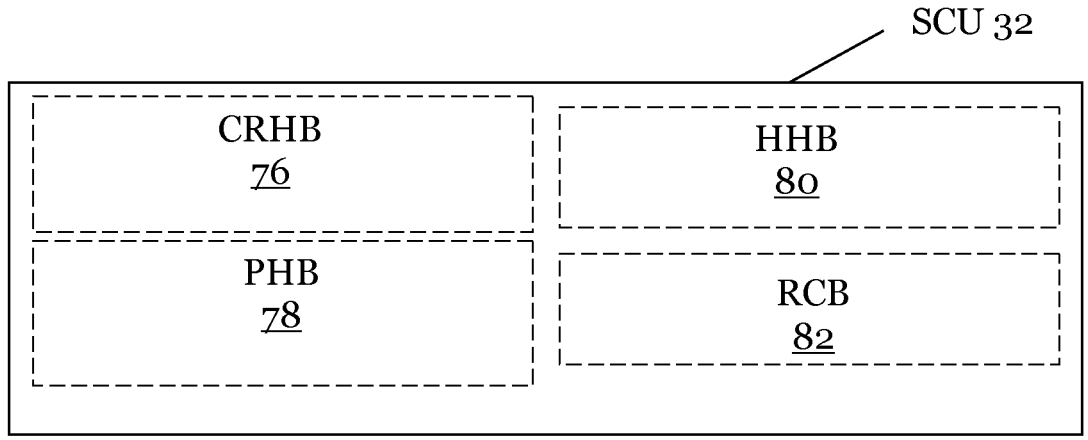

FIG. 7 shows a first realization of the second signalling control unit 32. In this first realization, the second signalling control unit 32 comprises a connection request handling block CRHB 76, a paging handling block PHB 78, a handover handling block HHB 80 and a redundancy control block RCB 82.

The blocks in FIG. 7 may be software blocks, for instance software blocks in a program memory. Alternatively, the blocks may be realized through processing circuitry or one or more hardware blocks, such as one or more dedicated special purpose circuits, like Application Specific Integrated Circuits (ASICs) and Field-Programmable Gate Arrays (FPGAs).

Figure 8:
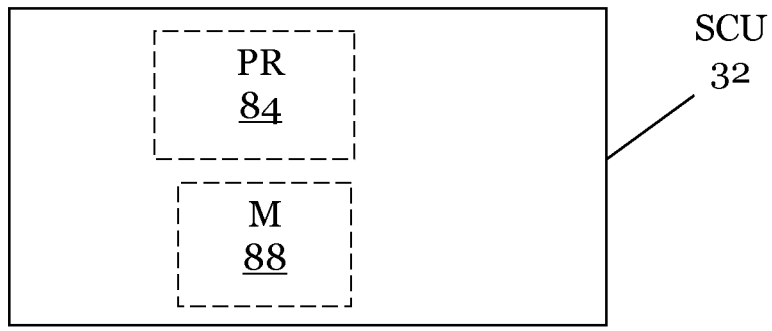
FIG. 8 shows a block schematic of a second realization of the second signalling control unit comprising a processor and a memory.

FIG. 8 shows a second way of realizing the second signalling control unit 32. It may be provided in the form of a processor PR 84 connected to a program memory M 88. The program memory 88 may comprise a number of computer instructions implementing the functionality of the second signalling control unit 32 and the processor 84 implements this functionality when acting on these instructions. It can thus be seen that the combination of processor 84 and memory 82 forms processing circuitry providing the second signalling control unit 32.

Figure 9:
FIG. 9 shows a method step in a first embodiment of a method for handling redundancy in the wireless communication system and being performed by the local control unit of the wireless node.
Figure 10:
FIG. 10 shows a method step in a first embodiment of a method of providing signalling redundancy in the wireless communication system and being performed by the second signalling control unit.

As was mentioned above the system provides redundancy especially with regard to signalling. This is also done while complying with the communication requirements of the communication standard used. The standard may for instance require that the cell identifier used in a cell is associated with a corresponding signalling control unit. There may also be a requirement that the core network communicates with two different access network nodes using different cell identifiers. In for instance the system in FIG. 1 the first signalling control unit 16 may provide a cell identifier for every cell handled by the node 14. In order to fulfil the communication requirements the second signalling control unit 32 in the second node 30 may likewise provide a cell identifier for all the cells handled by the node 30 and these may need to differ from the cell identifiers used in the first node 14. This means that in order to provide signalling redundancy, each cell may have two cell identifiers. How this can be handled for the first cell CA according to a first embodiment will now be described with reference being made to FIGS. 9 and 10, where FIG. 9 shows a method step in a method for handling redundancy in the wireless communication system and being performed by the first local control unit 18 and FIG. 10 shows a method step in a method of providing signalling redundancy in the wireless communication system and being performed by the second signalling control unit 32, where, as was mentioned above, the first local control unit 18 may be a part of the wireless node 58 and the second signalling control unit 32 may be a part of the wireless node 58 or of the signalling control device 74.

As can be seen above, the local control unit 18 of the wireless node 58 communicates with wireless communication devices 42 and 44 that camp on the first cell CA. The local control unit 18 is also set to communicate with the first and second signalling control units 16 and 32, where both are provided for handling signalling of a first group of cells CA, CB, CC, CD at least comprising the first cell CA, and each provides a different cell identity CI1, CI2 for this first cell CA here exemplified by the first and second cell identifiers CI1 and CI2.

The first signalling control unit 16 acts as a primary signalling control unit for the first group of cells CA, CB, CC and CD and the second signalling control unit 32 acts as a secondary signalling control unit for the first group of cells CA, CB, CC and CD, where a primary signalling control unit may be considered to be an active signalling control unit and a secondary signalling control unit may be considered to be a standby signalling control unit.

The first local control unit 18 may now communicate with the second signalling control unit 32 for implementing redundancy measures for the first cell CA making the secondary signalling control unit into a backup signalling control unit for the primary signalling control unit, step 90, while the second signalling control unit may implement redundancy measures for the first cell making the secondary signalling control unit into the backup signalling control unit for the primary signalling control unit, step 92. In order to implement the redundancy measures the second signalling control unit may at times communicate with the first local control unit.

One of the measures may be that only the cell identifier identified with the primary signalling control unit is broadcast in the cell CA and the cell identifier of the secondary signalling control unit is refrained from being used in the broadcasting. This means that in the given example, the first cell identifier CI1 associated with the first signalling control unit 16 is broadcast in the first cell CA, while the second cell identifier CI2 associated with the second signalling control unit 32 is not.

The redundancy measures may additionally comprise measures for handling connection requests, measures for handling paging and/or measures for handling handover. The measures may involve introducing handover and/or paging limitations for the secondary signalling control unit as well as introducing limitations in the handling of connection requests. A secondary signalling control unit may thus be allowed to interact with wireless communication devices as well as with the core network with regard to the initiation of user data transmissions to and from wireless communication devices in the first cell CA as well as with the moving of such user data transmissions. However, at least some of the interaction may be limited compared with the interaction that is possible for the primary signalling control unit.

The measures may additionally comprise measures for temporarily making the secondary signalling control unit into a primary signalling control unit.

Figure 11:
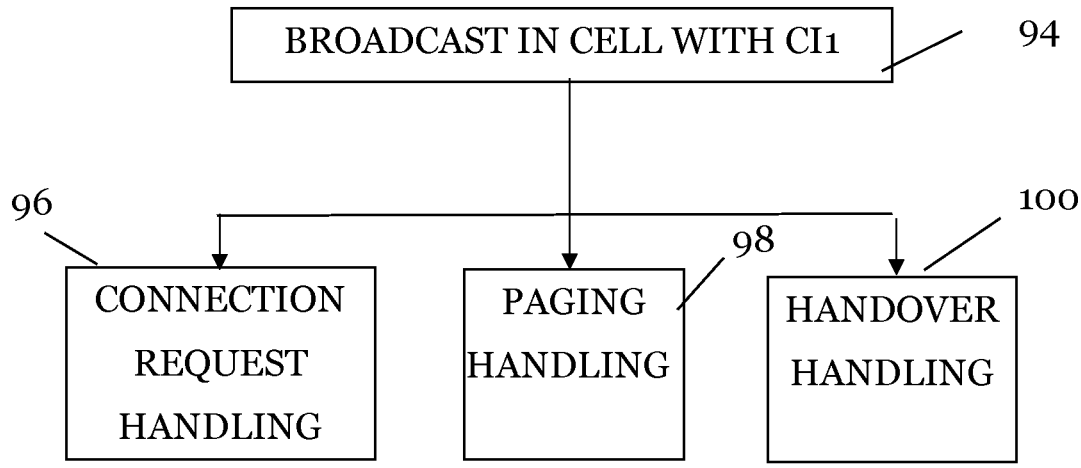
FIG. 11 shows a number of general method steps in a second embodiment of the method for handling redundancy in the wireless communication system and performed by the local control unit.
Figure 12:
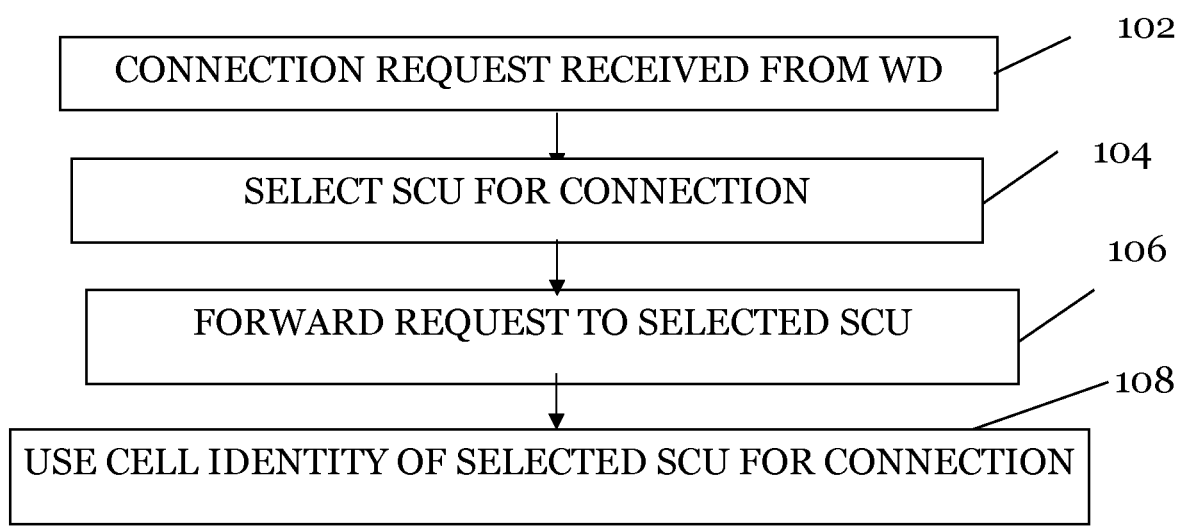
FIG. 12 shows a number of steps in the second embodiment of the method for handling redundancy for performing connection request handling.
Figure 13:
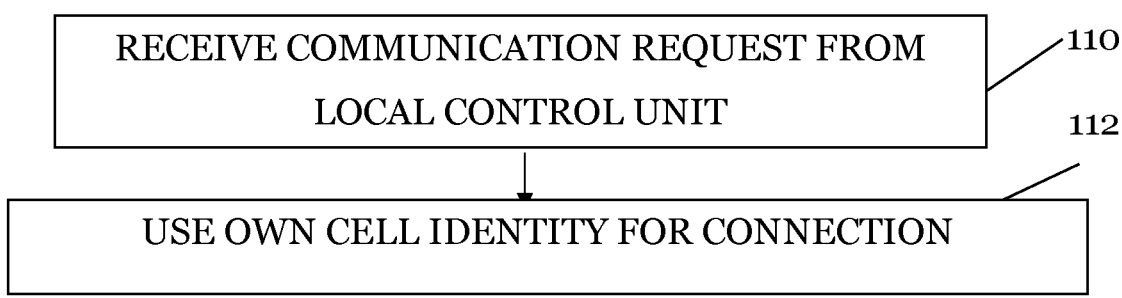
FIG. 13 shows method steps in a second embodiment of the method of providing signalling redundancy in the wireless communication system and being performed by the second signalling control unit, FIG. 14 schematically outlines the handling of handovers from the first signalling control unit and the second signalling control unit to a third signalling control unit.
Figure 14:
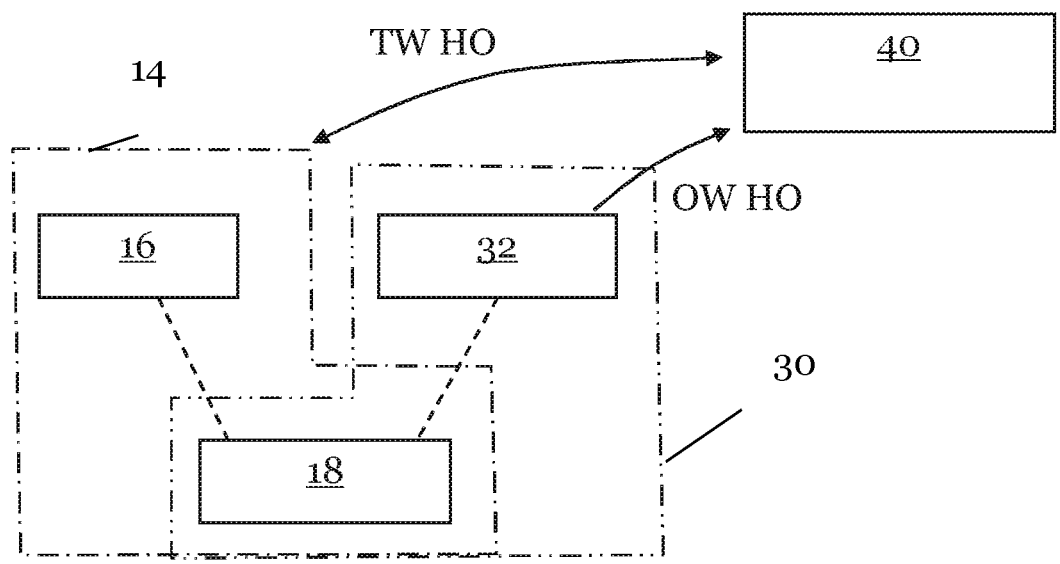
Figure 15:
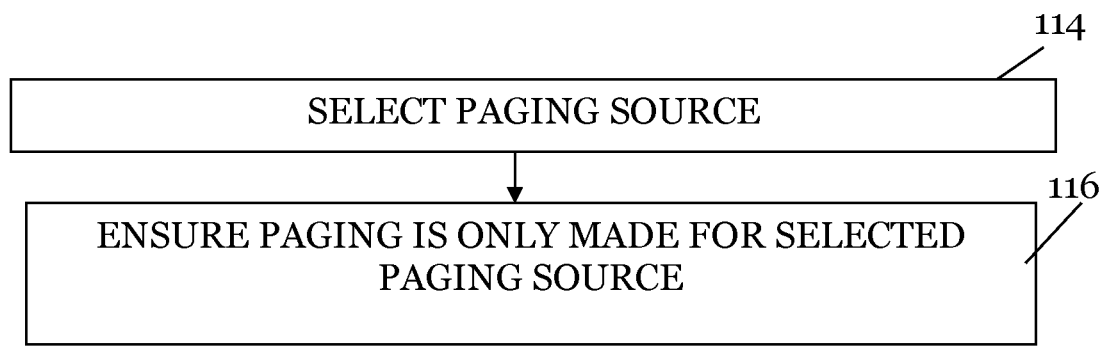
FIG. 15 shows a number of steps in the second embodiment of the method for handling redundancy for performing handover handling and paging handling, FIG. 16 schematically shows a first way of handling paging via the first and second local signalling control units.
Figure 16:
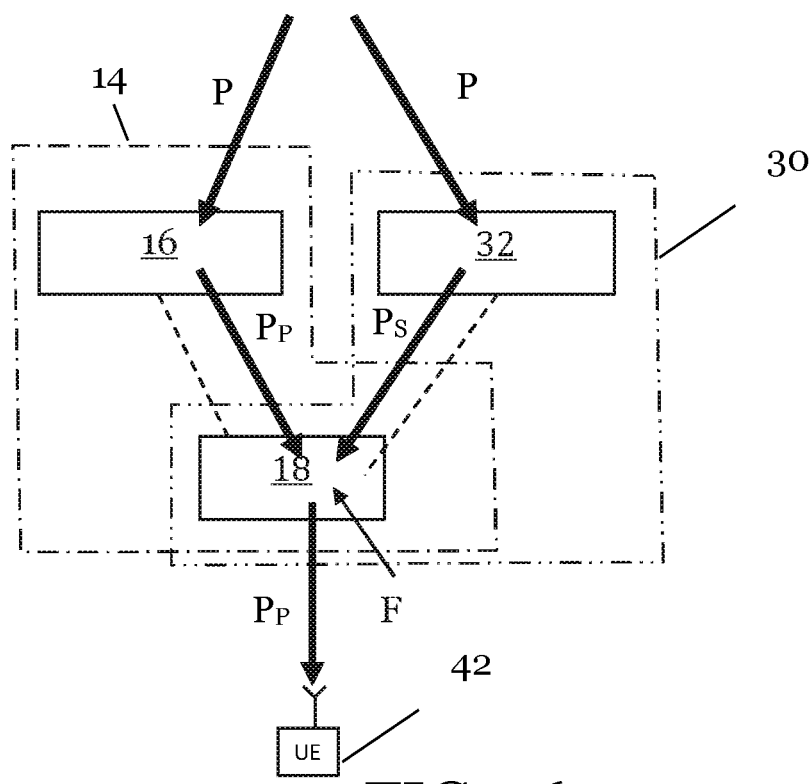
Figure 17:
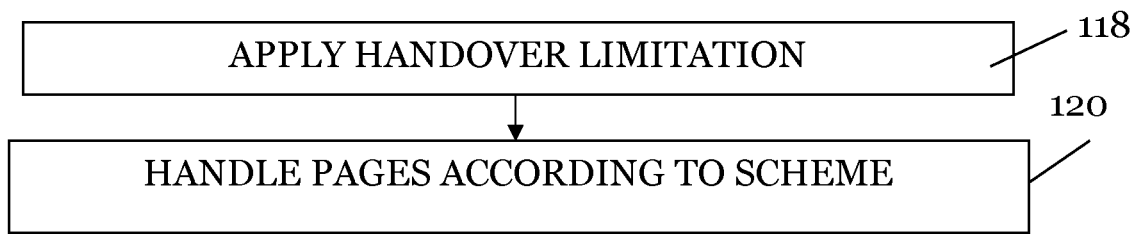
FIG. 17 shows a number of steps in the second embodiment of the method for handling redundancy when performing handover limitation and paging handling, FIG. 18 schematically shows a second way of handling paging via the first and second local signalling control units.
Figure 18:
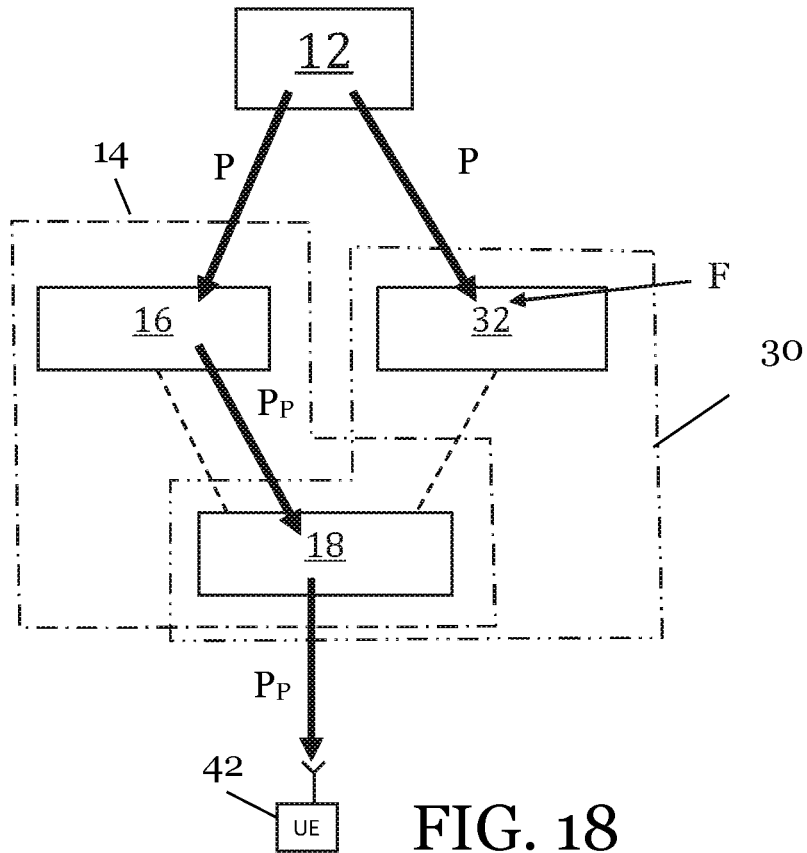
Figure 19:
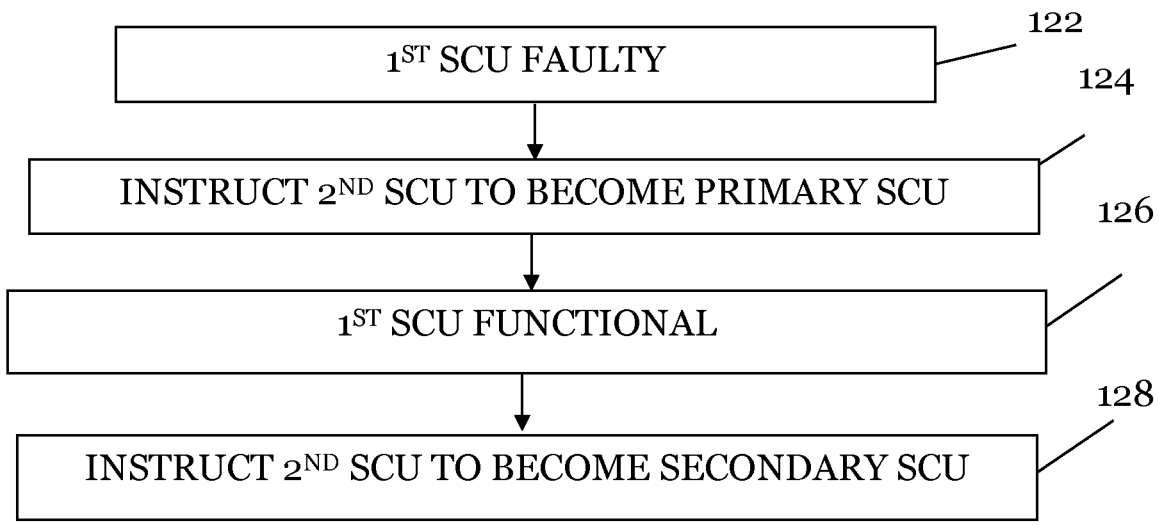
FIG. 19 shows a number of steps in the local control unit when the second signalling control unit temporarily takes over as a primary signalling control unit from the first signalling control unit.
Figure 20:
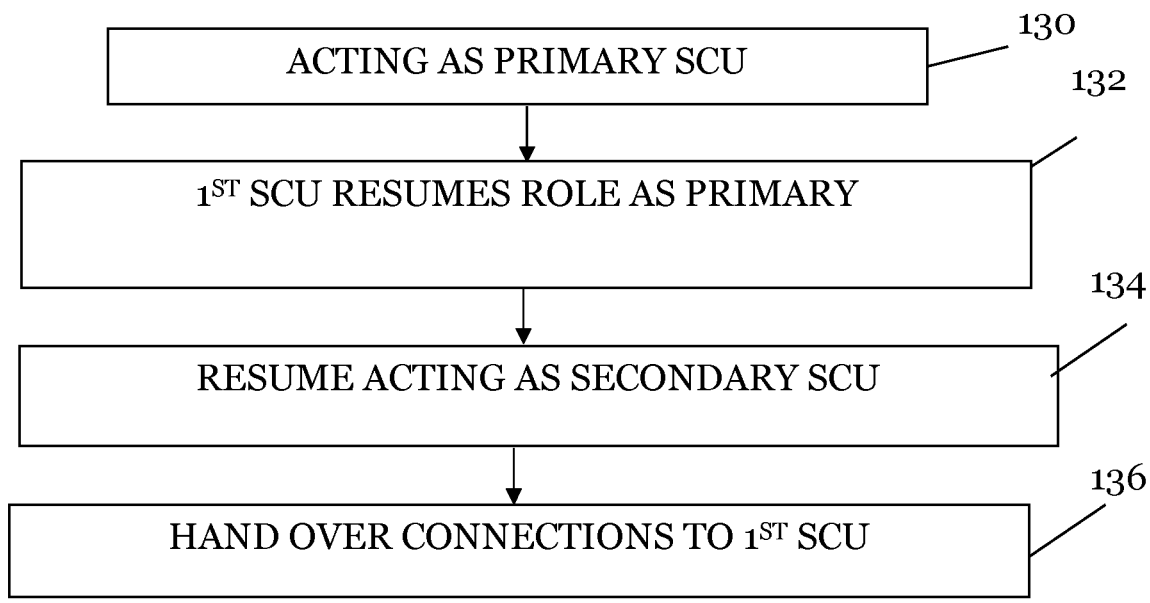
FIG. 20 shows a number of method steps in the second signalling control unit when resuming to act as a secondary signalling control unit.

How this may be done will now be described in some more detail in relation to a second embodiment with reference being made to FIG. 11-20, where FIG. 11 shows a number of general method steps in the method for handling redundancy in the wireless communication system performed by the local control unit, FIG. 12 shows a number of steps for performing connection request handling in the local control unit, FIG. 13 shows method steps for performing connection request handling in the second signalling control unit, FIG. 14 schematically outlines the handling of handovers from the first signalling control unit and the second signalling control unit to the third signalling control unit, FIG. 15 shows method steps for performing handover handling and paging handling in the local control unit, FIG. 16 schematically outlines a first way of handling paging via the first and second local signalling control units, FIG. 17 shows method steps for performing handover handling and paging handling in the second signalling control unit, FIG. 18 schematically outlines a second way of handling paging via the first and second local signalling control units, FIG. 19 shows a number of steps performed in the local control unit when the second signalling control unit temporarily takes over as a primary signalling control unit from the first signalling control unit and FIG. 20 shows a number of method steps in the second local control unit when resuming to act as a secondary signalling control unit.

As was mentioned above the first signalling control unit 16 is a primary signalling control unit while the secondary signalling control unit 32 is a secondary signalling control unit. Therefore, the broadcasting control element 60 of the local control unit 18 is set to perform broadcasting in the first cell CA using the first cell identifier CI1 of the first signalling control unit, step 94.

In the first cell CA a wireless communication device, such as the first wireless communication device 42, may want to communicate or make a user data transmission. This device 42 may therefore send a connection request to the first local control unit 18. Such a connection request is received by the first local control unit 18 via the transceiver 56 and antenna 57. One or more wireless communication devices may also be paged in the cell, for instance because they are to receive user data. In this case there may thus exist a desire to transmit user data to a wireless communication device in the cell CA, such as to the first wireless communication device 42. Such a page is typically received by a signalling control unit and then forwarded to the first local control unit 18, which in turn pages the wireless communication device via the transceiver 56 and antenna 57. It is additionally possible that a user data transmission of a wireless communication device is to be handed over between the first cell CA and another cell. In order to make such a handover the signalling control unit associated with a user data control unit via which the user data transmission takes place is involved. In order to handle these situations when there is signalling redundancy, the local control unit 18 implements a connection request handling scheme being run by the connection request handling element 62, step 96, a paging handling scheme run by the paging handling element 64, step 98, and a handover handling scheme being run by the handover handling element 66, step 100.

If for instance the first local control unit 18 receives a connection request from a wireless communication device such as the first wireless communication device 42, step 102, then the connection request handling element 62 applies the connection request handling scheme step 96.

The connection request handling scheme may more particularly comprise the connection request handling element 62 selecting a signalling control unit SCU that is to be used for the connection, step 104. It thus selects one of the primary and secondary signalling control units to be the recipient of a request for a connection received from the first wireless communication device 42 that camps on the first cell CA. The local control unit 18 can now send the request further to either of the signalling control units 16 and 32 and hence even if one of them has failed, the requests can be handled.

Thereafter the connection request handling element 62 of the local control unit 18 forwards the request to the selected signalling control unit, step 106, and furthermore also uses the cell identifier of the selected signalling control unit for the connection, step 108, where the cell identifier may be used in the contact with the core network 12.

It is possible that the primary signalling control unit is the preferred signalling control unit. However, at times it may be of interest to use the secondary signalling control unit. It is for instance possible to select the secondary signalling control unit in case the first node 14 is already experiencing a lot of user data or if it is faulty.

If the secondary signalling control unit is selected, which in this case is the second signalling control unit 32, the communication request handling block 76 of the second signalling control unit 32 then receives the request from the local control unit, step no, and uses its own cell identifier, e.g. the second cell identifier CI2, for connections set up based on connection requests from wireless communication devices in the first cell. This type of communication request handling is a first redundancy measure.

Thereafter a user data connection for the wireless communication device may be set up via a user data control unit associated with the selected signalling control unit, which user data control unit is located in the same access network node as the selected signalling control unit.

A second redundancy measure is the implementation of handover limitations. A primary signalling control unit may as an example be allowed two-way handovers TW HO. A handover involving the primary signalling control unit may thus be made both to and from the access network node comprising the primary signalling control unit, which in this example is the first access network node 14 comprising the first signalling control unit 16. It may as an example be possible to make handovers both from the first node 14 to the third node 40 and from the third node 40 to the first node 14. However, for the second node 30 acting as a backup it is possible that only one-way handovers OW HO are allowed. It is for instance possible that handovers are only allowed in one direction from the second node 30 to the third node 40. A user data connection existing at the third node 40 may thus be allowed to be moved to the first node 14 under the control of the first signalling control unit 16 acting as a primary signalling control unit together with a signalling control unit in the third node 40, but not to the second node 30. Connections that pass through both the first and second nodes 14 and 30 may however be handed over to the third node 40. Both the first and second signalling control units 16 and 32 may thus control, together with a signalling control unit in the third node 40, the handing over of a user data connection to the third node 40.

Put differently, the cells in a secondary signalling control unit can be considered as having neighbour cells for outgoing handovers, while no other node (of any radio access technology) should have it as a neighbor. Hence, a secondary signalling control unit shall not publish any cells over the Xn interface towards other access network nodes. The reason for this is that a neighbor cell is in wireless communication device measurements identified by its frequency and its cell identifier, in 5G often termed physical cell identity (PCI). A neighbor node will translate this into a global cell identity (which includes the cell identifier).

As an alternative, it is possible to allow the secondary signalling control unit to publish cells and allow a cell identifier conflict, a so-called 'PCI conflict'. In this case the neighboring node can choose to which 'NR Cell' (hence cell identifier) to make handover (or similar) to.

As yet another alternative, it is possible to only allow the primary signalling control unit to perform handovers and hence avoid the 'PCI conflicts' in the node handling the neighboring cell. All handovers between the first cell CA and other cells may thus be barred when the second node 30 is used. The secondary signalling control unit may thus have handover limitations.

It is possible that the handover handling element 66 of the local control unit informs the secondary signalling control unit of these limitations. This informing may take place over the F1-C interface (this is then an extension to the F1AP protocol on the F1-C interface).

If being informed, the handover handling block 80 of the second signalling control unit 32 may receive such information about the handover limitation from the local control unit 18 and then implement it, i.e. it may apply the handover limitation, step 118. It is as an alternative possible that the second signalling control unit is pre-configured with the handover limitations.

Another redundancy measure is the implementation of paging limitations. The paging handling element 64 of the first local control unit 18 may for instance ensure that paging is made for either of the primary or the secondary signalling control unit, where one possible variation is to ensure that paging is only made for the primary signalling control unit.

The paging handling element 64 of the first local control unit 18 may thereby select from which of the primary or secondary signalling control unit paging is to be received, i.e. which of them is to be a paging source, step 114, and then ensure that paging is only made for the selected paging source, step 116. It may also inform the non-selected signalling control unit to disable paging as well as inform the selected signalling control unit to keep on paging. Also in this case the F1-C interface may be used.

The paging handling block 78 of second signalling control unit 32 acting as a secondary signalling control unit handles pages according to the paging handling scheme, step 120. This may involve receiving such information about paging from the first local control unit 18. The paging handling block 78 will then pass the pages to or block the pages from reaching the local control unit based on the information. It may therefore apply the paging limitation which may thus involve disabling paging. It is also possible that paging is always made for the primary signalling control unit. Paging may thus only be made for the primary signalling control unit. In this case the secondary signalling control unit may be preconfigured to disable paging.

Paging from the core network towards a signalling control unit can be filtered away F either in the secondary signalling control unit (FIG. 18) or in the local control unit (FIG. 16). If filtering F is done in the secondary signalling control unit, both the primary and secondary signalling control unit receive pages P from the core network. The primary signalling control unit 16 then forwards Pp the pages it receives to the local control unit 16. However, the secondary signalling control unit may discard all the pages P that it receives from the core network. If filtering F is done in the local control unit 18, both the primary and secondary signalling control unit receives pages P from the core network and forwards them Pp and Ps to the local control unit 16. The pages and are thus received by the local control unit 18 from both the primary and the secondary control unit. The paging handling element 64 of the local control unit 18 may then select which page it is to used for paging a wireless communication device, such as the first wireless communication device 42. In the example given in FIG. 16 the paging handling element 64 selects the page Pp from the primary signalling control unit and discards the page Ps from the secondary signalling control unit. In this way the local control unit 18 can select which page to use as a run-time decision and hence switch immediately to the secondary signalling control unit in case the primary signalling control unit does not seem to work. It is also possible to select which signalling control unit is to act as a paging source based on processing load and/or amount of user data handled by the access network node that comprises the primary signalling control unit.

It is also possible that the secondary signalling control unit takes over the role as primary signalling control unit in case the first signalling control unit becomes faulty.

If the first signalling control unit 16 acting as a primary signalling control unit becomes faulty, step 122, then the redundancy control element 68 of the first local control unit 18 may instruct the second signalling control unit 32 to become a primary signalling control unit, step 124.

The redundancy control block 82 of the second signalling control unit 32 makes the second signalling control unit take over the role as a primary signalling control unit as the first signalling control unit is faulty, step 130, which may be done based on the reception of the previously mentioned notification.

If then the first signalling control unit 16 again becomes functional, step 126, the redundancy control element 68 of the local control unit 16 may instruct the second signalling control unit 32 to resume being secondary signalling control unit, step 128. If it is determined that a primary signalling control unit is down, it can thereby be decided to change the secondary signalling control unit into a primary signalling control unit, which may then be reflected in the system information broadcast to the wireless communication devices. It may also involve implementing the previously mentioned communication request handling limitations, handover limitations and paging limitations in the new primary and secondary signalling control units. The signalling control units may be preconfigured to implement these limitations. As an alternative the local control unit 18 can inform the first and second signalling control units 16 and 32, which can again be performed using F1-C interface.

If the second signalling control unit 32 is acting as a primary signalling control unit after the first signalling control unit has become faulty, step 130, the first signalling control unit may again become functional and resume its role as a primary signalling control unit, step 132. In this case, the redundancy control block 82 of the second signalling control unit 32 makes the second signalling control unit 32 resume acting as a secondary signalling control unit, step 134. The handover handling block 80 may additionally hand over one or more connections to the restored primary signalling control unit, step 136, which may be done upon receiving the instruction from the local control unit 18.

When a signalling control unit has been down and come up again, it is possible to use it for new connections and also if wanted to move ongoing connections to the newly restored signalling control unit by initiated directed inter gNodeB handovers from the old signalling control unit to the new signalling control unit.

A number of measures for providing signalling redundancy have been described above for the first local control unit and the first cell. It is of course possible to apply these measures also for the second cell.

Naturally the first and second signalling control units may in the same way act as primary and second signalling control units also for the second and third local control units.

However, the previously described principles are also possible to apply for another access network node. If for instance the third access network node comprises one or more local control units for wireless communication with wireless communication devices camping on a second group of cells that is disjoint from the first group of cells and there is a further signalling control unit in the third node acting as a primary signalling control unit for the second group of cells, then the second signalling control unit 32 in the second node 30 may be operative to act as a secondary signalling control unit also for the further local control units and the second group of cells.

The wireless communication system has a number of advantages. One advantage is that a local control unit can connect to two or more signalling control units at the same time. If new wireless communication device traffic is initiated, the local control unit can select which signalling control unit to send the connection to. In the simplest solution one signalling control unit is primary and it is used if it is working. This enables wireless communication device covered by cells in the local control unit to set up new connections even if one of the signalling control units has failed and hence give 100% availability at a single signalling control unit failures. This enables the HW and system realizing the signalling control unit to be implemented in a less complex and cheaper way. There is no need for 'High availability' HW or platforms.

Another advantage is that the core network is unaware about this redundancy solution and hence no updates in the Core Network—RAN interfaces and no core network internal changes are needed.

It is also possible to use all signalling control units if needed (e.g. overload of primary signalling control unit) or for load sharing (or in combination since some possibly only shall be used as last resort). It is possible to 'starve out' one signalling control unit (of its connections), e.g. before upgrade or wanting to move all connections to a primary signalling control unit.

Figure 21:
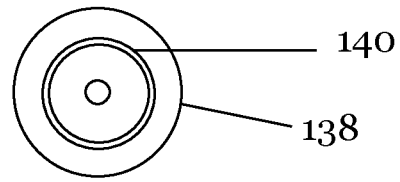
FIG. 21 shows a computer program product comprising a data carrier with computer program code for implementing functionality of the wireless node.

The computer program code of the local control unit may be in the form of computer program product for instance in the form of a data carrier, such as a CD ROM disc or a memory stick. In this case the data carrier carries a computer program with the computer program code, which will implement the functionality of the local control unit. One such data carrier 138 with computer program code 140 is schematically shown in FIG. 21.

Figure 22:
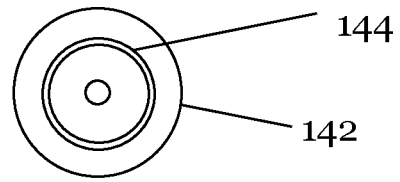
FIG. 22 shows a computer program product comprising a data carrier with computer program code for implementing functionality of the signalling control device.

The computer program code of the second signalling control unit may also be in the form of computer program product for instance in the form of a data carrier, such as a CD ROM disc or a memory stick. In this case the data carrier carries a computer program with the computer program code, which will implement the second signalling control unit. One such data carrier 142 with computer program code 144 is schematically shown in FIG. 22.

The local control unit may furthermore be considered to comprise means for communicating with the second signalling control unit for implementing redundancy measures for the first cell making the secondary signalling control unit into a backup signalling control unit for the primary signalling control unit.

The local control unit may also be considered to comprise means for broadcasting the cell identity of the primary signalling control unit in the first cell.

The means for communication with the secondary signalling control unit may additionally be considered to comprise means for selecting one of the primary and secondary signalling control units to be the recipient of a request for a connection received from a wireless communication device that camps on the first cell, means for forwarding the connection request to the selected signalling control unit and means for using the cell identity of the selected signalling control unit for the connection.

The means for communication with the secondary signalling control unit may also be considered to comprise means for informing the secondary signalling control unit that it has handover limitations in relation to the first cell.

The local control unit may additionally be considered to comprise means for ensuring that paging in the first cell is made for one of the primary and secondary signalling control units. The means for ensuring that paging in the first cell is made for one of the primary and secondary signalling control units may additionally be considered to comprise means for selecting which signalling control unit for which paging is to be made. The means for ensuring that paging in the first cell is made for one of the primary and secondary signalling control units may additionally be considered to comprise means for instructing one of the secondary signalling control units to filter away paging for the first cell. The means for ensuring that paging in the first cell is made for one of the primary and secondary signalling control units may additionally be considered to comprise means for removing pages for the first cell received from the one of the secondary signalling control units and means for transmitting the other pages in the cell.

The means for communication with the secondary signalling control unit may also be considered to comprise means for instructing the second signalling control unit to become a primary signalling control unit in case the first signalling control unit acting as a primary signalling control unit becomes faulty.

The means for communication with the secondary signalling control unit may also be considered to comprise means for instructing the second signalling control unit to resume being secondary signalling control unit in case the first signalling control unit again becomes functional.

The second signalling control unit may also be considered to comprise means for acting as a secondary signalling control unit for the first group of cells, which means for acting as a secondary signalling control unit comprises means for implementing redundancy measures for the first cell making the secondary signalling control unit into a backup signalling control unit for the primary signalling control unit.

The means for implementing redundancy measures in the second signalling control unit may comprise means for using the second cell identity for connections set up based on connection requests from wireless communication devices in the first cell.

The means for implementing redundancy measures may additionally comprise means for applying handover limitations for the wireless communication devices in the first cell.

The means for implementing redundancy measures may furthermore be considered to comprise means for receiving information about the handover limitations from the local control unit.

The means for implementing redundancy measures may additionally be considered to comprise means for receiving information of paging handling routines from the local control unit. The means for receiving information of paging handling routines may be considered to comprise means for receiving an instruction from the local control unit regarding how to handle pages and means for passing the pages to or blocking the pages from reaching the local control unit based on the instruction. The means for implementing redundancy measures may additionally be considered to comprise means for disabling paging of wireless communication devices in the first cell.

The second signalling control unit may furthermore be considered to comprise means for taking over the role as a primary signalling control unit for the first cell in case the first signalling control unit is faulty.

The second signalling control unit may additionally be considered to comprise means for the resuming acting as a secondary signalling control unit and means for handing over one or more connections to the restored primary signalling control unit.

The second signalling control unit may additionally be considered to comprise means for acting as a secondary control unit also for a second group of cells, where the means for acting as a secondary control unit for a second group of cells may comprise means for implementing redundancy measures for a cell in the second group of cells.

While the invention has been described in connection with what is presently considered to be most practical and preferred embodiments, it is to be understood that the invention is not to be limited to the disclosed embodiments, but on the contrary, is intended to cover various modifications and equivalent arrangements. Therefore, the invention is only to be limited by the following claims.

The invention claimed is:

1. A wireless node in a wireless communication system and comprising a local control unit and radio communication circuitry for wireless communication with wireless communication devices that camp on a first cell, the local control unit being set to communicate with a first and a second signalling control unit, both being provided for handling signalling of a first group of cells at least comprising said first cell, each providing a different cell identity for this first cell, the first signalling control unit acting as a primary signalling control unit for said first group of cells and the second signalling control unit acting as a secondary signalling control unit for said first group of cells, the wireless node comprising a processor acting on computer instructions implementing the local control unit whereby said local control unit is operative to:
communicate with the second signalling control unit for implementing redundancy measures for the first cell making the secondary signalling control unit into a backup signalling control unit for the primary signalling control unit; and
informing the secondary signalling control unit that it has handover limitations in relation to said first cell.

2. The wireless node according to claim 1, wherein the local control unit is configured to broadcast the cell identity of the primary signalling control unit in the first cell.

3. The wireless node according to claim 1, wherein the communication with the secondary signalling control unit comprises selecting one of the primary and secondary signalling control units to be recipient of a request for a connection received from a wireless communication device camping on the first cell, forwarding the connection request to the selected signalling control unit and using the cell identity of the selected signalling control unit for the connection.

4. The wireless node according to claim 1, the local control unit being further operative to ensure that paging in the first cell is made for one of the primary and secondary signalling control units.

5. The wireless node according to claim 4, wherein the ensuring that paging in the first cell is made for one of the primary and secondary signalling control unit comprises instructing one of the signalling control units to filter away paging for the first cell.

6. The wireless node according to claim 4, wherein the ensuring that paging in the first cell is only made for one of the primary and secondary signalling control units comprises removing pages for the first cell received from one of the signalling control units and transmitting the pages from the other signalling control unit in the cell.

7. The wireless node according to claim 1, wherein the local control unit is operative to instruct the second signalling control unit to become a primary signalling control unit in case the first signalling control unit acting as a primary signalling control unit becomes faulty.

8. The wireless node according to claim 7, wherein the local control unit is operative to instruct the second signalling control unit to resume being secondary signalling control unit in case the first signalling control unit again becomes functional.

9. A method of handling redundancy in a wireless communication system comprising a wireless node for wireless communication with wireless communication devices that camp on a first cell, the wireless node comprising a local control unit controlling communication between the wireless communication system and the wireless communication devices, the local control unit being set to communicate with a first and a second signalling control unit, both being provided for handling signalling of a first group of cells at least comprising said first cell, each providing a different cell identity for this first cell, the first signalling control unit acting as a primary signalling control unit for said first group of cells and the second signalling control unit acting as a secondary signalling control unit for said first group of cells, the method being performed by the local control unit and comprising:
communicating with the second signalling control unit for implementing redundancy measures for the first cell making the secondary signalling control unit into a backup signalling control unit for the primary signalling control unit; and
informing the secondary signalling control unit that it has handover limitations in relation to said first cell.

10. The method according to claim 9, further comprising broadcasting the cell identity of the primary signalling control unit in the first cell.

11. The method according to claim 9, wherein the communicating with the secondary signalling control unit comprises selecting one of the primary and secondary signalling control units to be recipient of a request for a connection received from a wireless communication device camping on the first cell, forwarding the connection request to the selected signalling control unit and using the cell identity of the selected signalling control unit for the connection.

12. The method according to claim 9, further comprising ensuring that paging in the first cell is only made for one of the primary and secondary signalling control units.

13. The method according to claim 9, further comprising instructing the second signalling control unit to become a primary signalling control unit in case the first signalling control unit acting as a primary signalling control unit becomes faulty.

14. The method according to claim 13, further comprising instructing the second signalling control unit to resume being secondary signalling control unit in case the first signalling control unit again becomes functional.

15. A computer program product for handling redundancy in a wireless communication system comprising a wireless node for wireless communication with wireless communication devices that camp on a first cell, the wireless node comprising a local control unit controlling communication between the wireless communication system and the wireless communication devices, the local control unit being set to communicate with a first and a second signalling control unit, both being provided for handling signalling of a first group of cells at least comprising said first cell, each providing a different cell identity for this first cell, the first signalling control unit acting as a primary signalling control unit for said first group of cells and the second signalling control unit acting as a secondary signalling control unit for said first group of cells, the computer program product comprising a non-transitory storage medium including computer program code which when run by a processor of the wireless node causes the local control unit to:

communicate with the second signalling control unit for implementing redundancy measures for the first cell making the secondary signalling control unit into a backup signalling control unit for the primary signalling control unit; and inform the secondary signalling control unit that it has handover limitations in relation to said first cell.

16. A signalling control device for a first group of cells at least comprising a first cell in a wireless communication system, said wireless communication system comprising a wireless node for wireless communication with wireless communication devices that camp on the first cell, the wireless node comprising a local control unit controlling communication between the wireless communication system and the wireless communication devices, the local control unit being set to communicate with a first and a second signalling control unit, both being provided for handling signalling of the first group of cells, each providing a different cell identity for this first cell and the first signalling control unit acting as a primary signalling control unit for said first group of cells, the signalling control device comprising a processor acting on computer instructions whereby said signalling control device is operative to implement the second signalling control unit acting as a secondary signalling control unit for the first group of cells wherein the acting as a secondary signalling control unit comprises implementing redundancy measures for the first cell making the secondary signalling control unit into a backup signalling control unit for the primary signalling control unit, and applying handover limitations for the wireless communication devices in the first cell.

17. The signalling control device according to claim 16, wherein broadcasting in the first cell is made using the cell identity of the primary signalling control unit and the implementing of redundancy measures comprises using the second cell identity for connections set up based on connection requests from wireless communication devices in the first cell.

\* \* \* \* \*